(12) United States Patent
Keiller et al.

(10) Patent No.: US 6,823,308 B2
(45) Date of Patent: Nov. 23, 2004

(54) SPEECH RECOGNITION ACCURACY IN A MULTIMODAL INPUT SYSTEM

(75) Inventors: Robert Alexander Keiller, Guildford (GB); Nicolas David Fortescue, Oxford (GB)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 09/783,971

(22) Filed: Feb. 16, 2001

(65) Prior Publication Data

US 2001/0037201 A1 Nov. 1, 2001

(30) Foreign Application Priority Data

Feb. 18, 2000 (GB) ............................................. 0003903

(51) Int. Cl.$^7$ ......................... G10L 15/14; G10L 15/08; G10L 15/28
(52) U.S. Cl. ....................... 704/256; 704/236; 704/239; 704/255
(58) Field of Search ............................... 704/200, 220, 704/240, 256, 9, 232; 707/3

(56) References Cited

U.S. PATENT DOCUMENTS

| | | | | |
|---|---|---|---|---|
| 4,876,720 A | * | 10/1989 | Kaneko et al. | 704/240 |
| 5,689,616 A | * | 11/1997 | Li | 704/232 |
| 5,748,974 A | | 5/1998 | Johnson | 395/759 |
| 5,781,179 A | | 7/1998 | Nakajima et al. | 345/157 |
| 5,895,464 A | * | 4/1999 | Bhandari et al. | 707/3 |
| 5,960,395 A | | 9/1999 | Tzirkel-Hancock | 704/241 |
| 6,115,683 A | * | 9/2000 | Burstein et al. | 704/9 |
| 6,411,925 B1 | * | 6/2002 | Keiller | 704/200 |
| 2002/0111798 A1 | * | 8/2002 | Huang | 704/220 |

FOREIGN PATENT DOCUMENTS

| | | | | |
|---|---|---|---|---|
| JP | 08-095734 | * | 12/1996 | G06F/3/14 |
| WO | WO 99/46763 | | 9/1999 | |
| WO | WO 00/08547 | | 2/2000 | |

OTHER PUBLICATIONS

Johnston et al ("Unification–Based Multimodal Integration", Assoc. Computational Linguistics, 1997).*
Mellish, et al., "Techniques in Natural Language Processing 1" (1994).
Allen, et al., "Chart Parsing", Chapter 3, "Natural Language Understanding" (1987 (1$^{st}$ publishing) & 1994 (2$^{nd}$ publishing)).
U.S. patent application Ser. No. 09/409,250, Keiller, filed Jun. 2002.*
U.S. patent application Ser. No. 09/409,249, Keiller, filed Sep. 1999.*
U.S. patent application Ser. No. 09/669,510, Fortescue et al., filed Oct. 2000.*
U.S. patent application Ser. No. 09/652,932, Keiller, filed May 2000.*
U.S. patent application Ser. No. 09/551,909, Rees et al., filed Apr. 2000.*

(List continued on next page.)

Primary Examiner—Richemond Dorvil
Assistant Examiner—Daniel A Nolan
(74) Attorney, Agent, or Firm—Fitzpatrick, Cella, Harper & Scinto

(57) ABSTRACT

A speech recognition method for use in a multimodal input system comprises receiving a multimodal input comprising digitized speech as a first modality input and data in at least one further modality input. Features in the speech and in the data in at least one further modality are identified. The identified features in the speech and in the data are used in the recognition of words by comparing the identified features with states in models for the words. The models have states for the recognition of speech and for words having features in at least one further modality associated with the words, the models also have states for the recognition of events in the further modality or each further modality.

31 Claims, 7 Drawing Sheets

OTHER PUBLICATIONS

WorldNet® ("Princeton University Cognitive Science Laboratory Internet page", http://www.cogsci.princeton.edu), Jan. 2001.*

Johnston et al ("Unification–Based Multimodal Integration", Assoc. Computational Linguistics, 1997).*

"Unification–based Multimodal Integration", Johnson, et al., In the Proceedings of the 35$^{th}$ Annual meeting of the Association for Computational Linguistics and 8$^{th}$ Conference of the European Chapter of the Association for Computational Linguistics, 1997, pp. 281–288.

"Research in Multimedia and Multimodal Parsing anf Generation", Mark T. Maybury—Conference proceedings of Coling 94, Computational Linguistics. International Conference. 15th, Aug. 1994 Kyoto, Japan.

"Put That Where? Voice and Gesture at the Graphics Interface" M. Billinghurst—ACM SIGGRAPH vol. 32, No. 4, Nov. 1998.

"Pearl: A Probabilistic Chart Parser" Magerman et al in Proceedings, European ACL, Apr. 1991. Also published in Proceedings, Second International Workshop for Parsing Technologies, Feb. 1991.

"A Generic Platform for Addressing the Multimodal Challenge" Laurence Nigay, et al.—Conference proceedings on Human Factors in computing systems, May 7–11, 1995 Denver, CO USA.

* cited by examiner

SPEECH RECOGNITION ACCURACY IN A MULTIMODAL INPUT SYSTEM

The present invention generally relates to the improvement of the accuracy of speech recognition in a complementary multimodal input system.

Interfaces which use speech as an input and at least one further modality input are known as multimodal systems. In multimodal systems where two modalities contain the same information content they are termed redundant e.g. speech recognition and lip movement recognition. Where two modalities each contain their own information they are termed complementary e.g. speech recognition and eyebrow movement recognition (since although eyebrow movement can be related to speech, it can include its own information e.g. emotion), and speech recognition and pointing events such as mouse clicks. Complementary modality input systems provide a more natural and powerful method of communication than any single modality can alone. The further modalities can for example comprise pointing events from pointing devices such as a mouse, touch screen, joystick, tracker ball, or a track pad, a pen input in which handwriting is recognised, or gesture recognition. Thus in complementary multimodal systems, parallel multimodal inputs are received and processed in order to control a system such as a computer.

It is known that speech recognition engines do not always perform correct recognition on the speech.

It is therefore an object of the present invention to improve the accuracy of speech recognition using the further modality inputs in a complementary multimodal system.

In accordance with a first aspect, the present invention provides a speech recognition method and apparatus for use in a complementary multimodal input system in which a digitized speech input as a first modality and data in at least one further complementary modality is received. Features in the digitized speech are extracted or identified. Also features in the data in each further modality input are extracted or identified. Recognition is then performed on the words by comparing the identified features with states in models for words. The models have states for the recognition of speech and, where words have features in one or more further modality associated with them, models for those words also have states for the recognition of associated events in each further modality. Thus the models for the words used in the recognition utilise not just the features of the first modality input, but also the features of at least one further modality input. This greatly improves the recognition accuracy, since more data is available from a different source of information to aid recognition. The recognition engine will not recognise words as words which should have further modality inputs if those further modality inputs have not been received in association with the spoken words.

This invention is applicable to a complementary multimodal input system in which the improved speech recognition technique is used for the input of recognised words, and inputs to a processing system are generated by processing the recognised words and data from at least one further modality input in accordance with multimodal grammar rules. Thus in this aspect of the present invention, a more accurate input is achieved to the processing system.

In one embodiment, the models comprise an array of states having a dimensionality equal to the number of modes in the received multimodal input. Recognition then preferably takes place by sequentially transiting between states in a first dimension upon receipt of a feature in the speech input and transiting along the states in the further dimension or each further dimension upon receipt of the appropriate feature in the further modality input or each further modality input. Thus in one embodiment, the models for the words use states of Hidden Markov models for speech and states of finite state machines for the further modality input or each further modality input. The transitions between states in the model have probabilities associated with them in one embodiment thereby resulting in an accumulated probability during the recognition process. Thus in this embodiment, in accordance with conventional speech recognition processes, a word is recognised which has the highest accumulated probability at a final state in the word model.

The present invention can be implemented in dedicated specifically designed hardware. However, more preferably the present invention is implemented using a general purpose computer controlled by software. Thus the present invention encompasses program code for controlling a processor to implement the technique. The present invention can thus be embodied as a carrier medium carrying the program code. Such a carrier medium, can for example comprise a storage medium such as a floppy disk, CD ROM, hard disk drive, or programmable read only memory device, or the carrier medium can comprise a signal such as an electrical signal carried over a network such as the Internet.

An embodiment of the present invention will now be described with reference to the accompanying drawings, in which.

Figure 1:
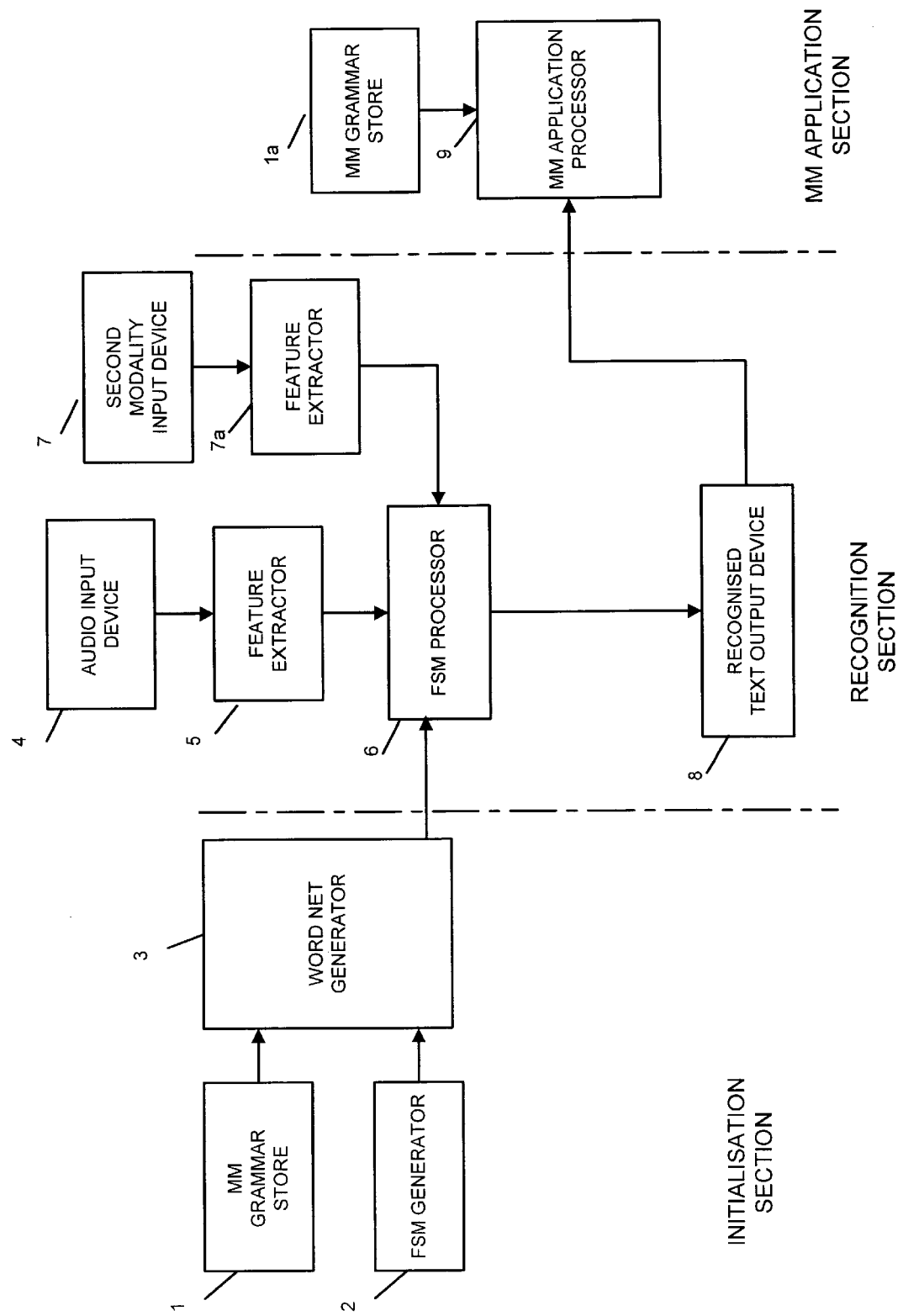
FIG. 1 is a schematic diagram of a complementary multimodal system in accordance with the embodiment of the present invention.

FIG. 1 is a schematic diagram of the complementary multimodal system of the embodiment of the present invention. The system can be divided into three functional sections. In an initialisation section a net of words (referred to herein as a "word net" of word models is generated for use in the recognition section. A recognition section performs recognition on a multimodal input comprising an audio input and a second modality input and generates recognised text for input to a multimodal application section together with the second modality input.

The initialisation section is provided with a multimodal grammar store 1. The multimodal grammar store 1 stores grammar rules to be used in the recognition process. The grammar rules comprise context free grammar and are defined as a function of not just the speech modality input, but also the second modality input. For example, for an instruction to send a document by facsimile to a destination, a grammar rule can be provided to allow a user to say "fax this to him" whilst pointing to a displayed document when saying "this" and subsequently pointing to a displayed identified person when saying "him".

To allow for synonyms to be used, thus providing a more flexible input system, a grammar rule can be defined as follows:

```
<fax rule>=<fax word>[(<this word>&!click)|(these &!click(2+))]
    to(<him word>&!click)
``` where

<fax word>=fax|send
    <this word>=this|that
    <him word>=him|her

Thus the grammar rule open <fax rule> is defined as a function of recognised words (fax, send, this, that, these, to, him, her) and mouse events (clicks). The grammar rule <fax rule> can be defined in terms of variables such as <fax word> to allow for a simpler definition of the grammar rules.

Figure 5:
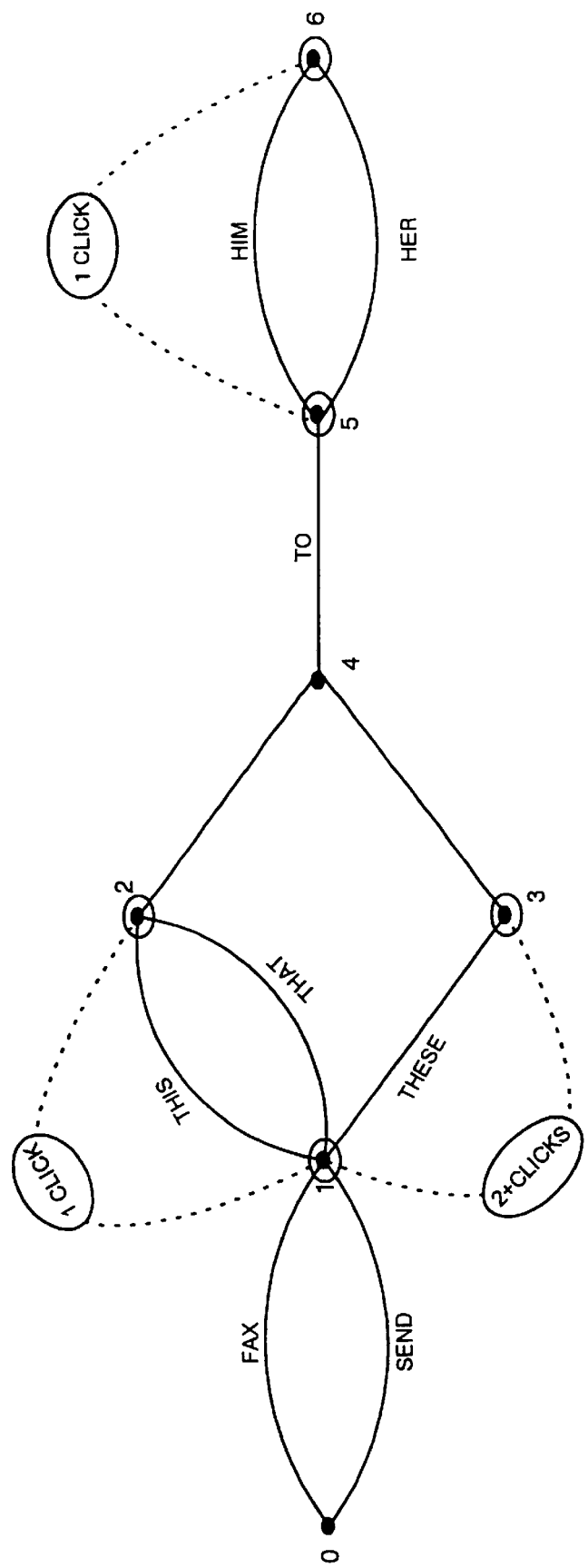
FIG. 5 is a diagram illustrating the word net used in the recognition process of the embodiment of the present invention.
Figures 6A, 6B:
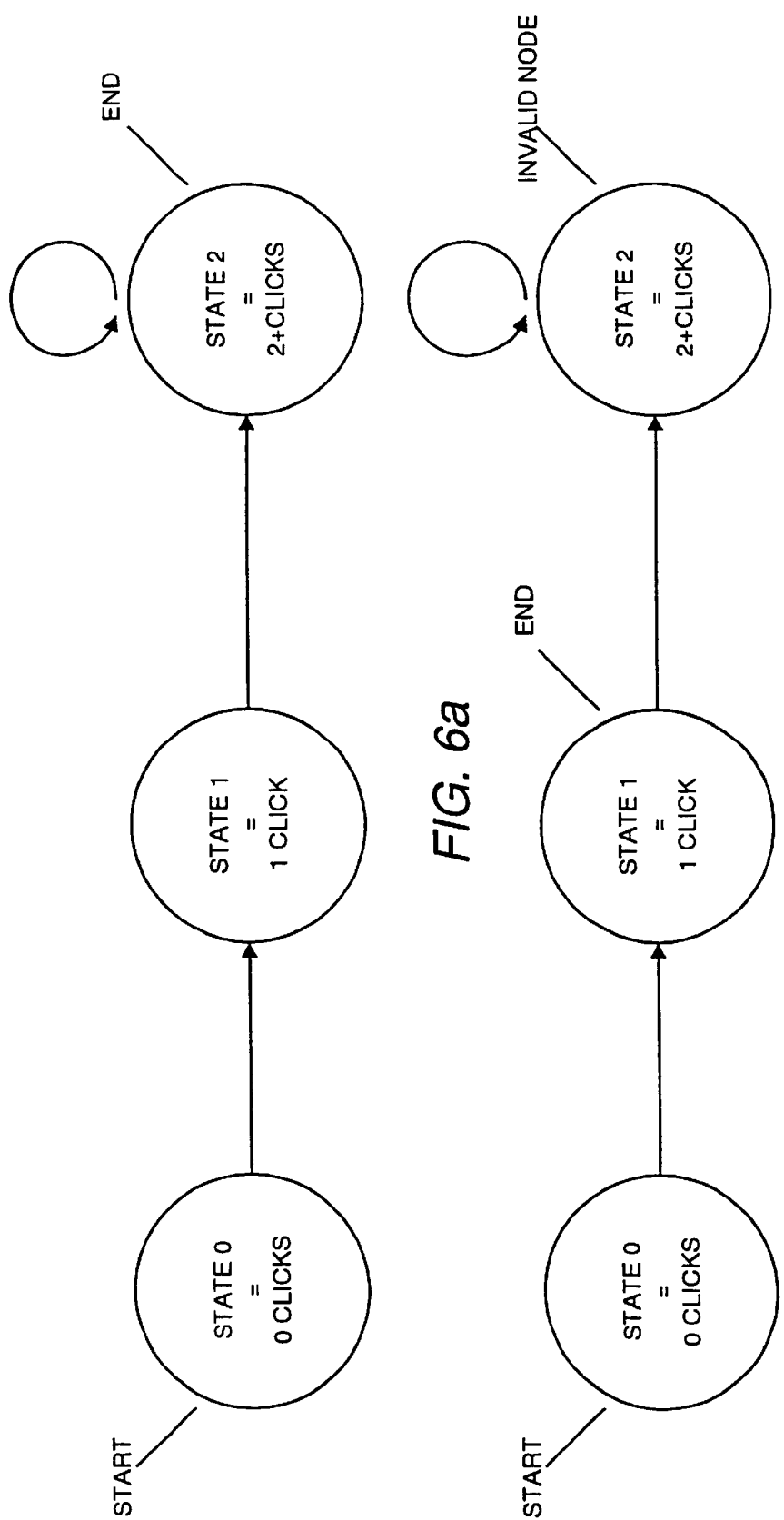
FIGS. 6a and 6b are diagrams illustrating finite state machines for a further modality input.

In the arrangement of FIG. 1, the grammar rules are input from the grammar store 1 to a word net generator 3. The word net generator 3 uses the grammar rules in order to generate a word net. The word net generated using the grammar rule given above is illustrated in FIG. 5 and has nodes 0 to 6. It can be seen that between certain nodes of the word net i.e. between nodes 1 and 2, 1 and 3, and 5 and 6, simultaneous mouse events are required. In order to accommodate these simultaneous mouse events in the recognition process using the word net, a finite state machine generator 2 is provided to generate a finite state machine for the second modality input. FIG. 6a illustrates the states of a finite state machine for the event comprising 2 or more mouse clicks. FIG. 6b illustrates the states for an event comprising a single mouse click. The word net generator 3 receives the generated states and incorporates these within the word net as will be described in more detail hereinafter.

The generated wordnet is then made available to the FSM processor 6 to perform recognition within the recognition section.

The recognition section comprises an audio input device 4 for inputting digitized speech. A feature extractor 5 is provided to receive the digitized speech to extract features of the speech as is well known in the art. A second modality input device 7 is provided for the input of second modality events such as mouse click events. A further feature extractor 7a is provided to extract features from the events. In this particular embodiment the feature extractor 7a simply identifies individual mouse clicks in an event which may comprise 1, 2, or more mouse clicks. The extracted features of the speech input and of the second modality input are then input into the FSM processor 6 which uses the generated word net in order to perform recognition. A recognised text output device 8 is provided to output the words recognised by the FSM processor 6 to the multimodal application 9 in the multimodal application section.

In the multimodal application section, a multimodal application processor 9 is provided which receives the recognised text and the second modality input from the second modality input device 7 in order to generate an input to the application. Also, the multimodal application processor 9 receives grammar rules from a multimodal grammar store 1a which stores the same grammar rules as in the multimodal grammar store 1 in the initialisation section.

Thus the multimodal application processor 9 is able to generate an input to a process based on an accurately recognised text which has been recognised taking into consideration the second modality input.

Figure 2:
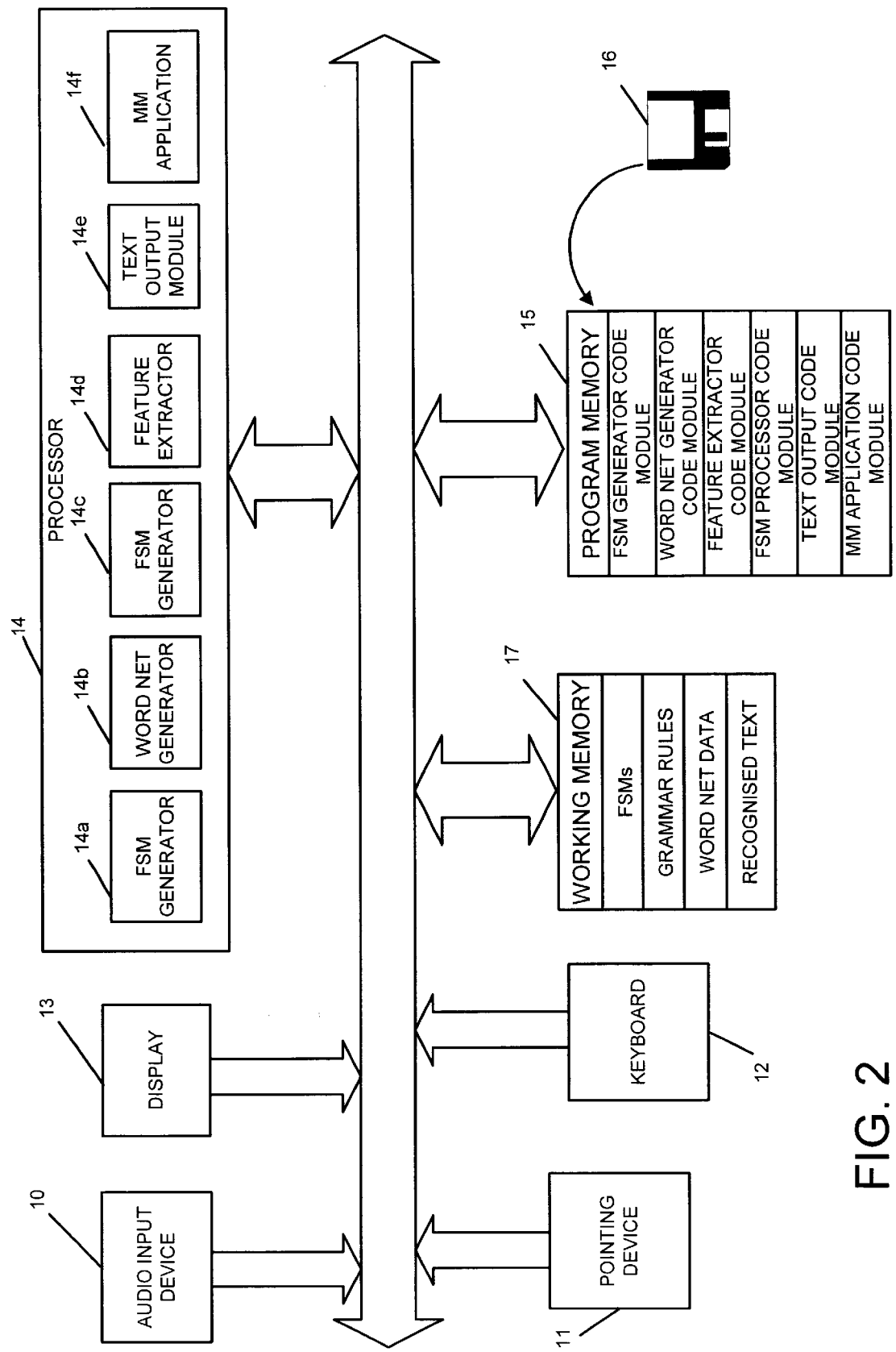
FIG. 2 is a schematic diagram of an implementation of the multimodal system in accordance with the embodiment of the present invention.

FIG. 2 is a schematic diagram of a practical implementation of the embodiment of the present invention. This embodiment of the present invention is carried out by the implementation of computer code by a general purpose computer.

The computer comprises an audio input device 10 for inputting digitized speech. A pointing device 11 is provided for inputting the second modality input which in this case comprise mouse events comprising one or more mouse clicks. The computer is also provided with a conventional keyboard 12 and display 13.

The computer comprises a processor 14 for implementing program code modules stored in a program memory 15. The program code modules can be supplied to the program memory 15 by a suitable carrier medium 16 such as a floppy disk. The processor 14 implements the FSM generator 14a by loading and running the FSM generator code module from the program memory 15. The processor also implements the word net generator 14b by loading and running the word net generator code module from the program memory 15. The processor further implements the FSM processor 14c by loading and running the FSM processor code module from the program memory 15. The processor 14 also implements the feature extractor 14d by loading the feature extractor code module from the program memory 15. The processor 14 further implements the text output module 14e by loading and running a text output code module stored in the program memory 15. The processor 14 further implements the multimodal application 14f by loading and running the multimodal application code module stored in the program memory 15. The processor 14 is the central processing unit (CPU) of the general purpose computer and the program memory 15 comprises any memory capable of storing programs such as random access memory (RAM), read only memory (ROM), a hard disk drive, or CD ROM.

The computer is also provided with working memory 17 to be used by the processor 14 during the operation of the processor. The working memory 17 can store the generated finite state machines, the grammar rules, the word net data, and the recognised text. The working memory 17 can comprise any conventional memory accessible by the processor 14 such as random access memory (RAM).

The processor 14 is coupled to the audio input device 10, pointing device 11, keyboard 12, display 13, working memory 17, and a program memory 15 by bus 18.

Figure 3:
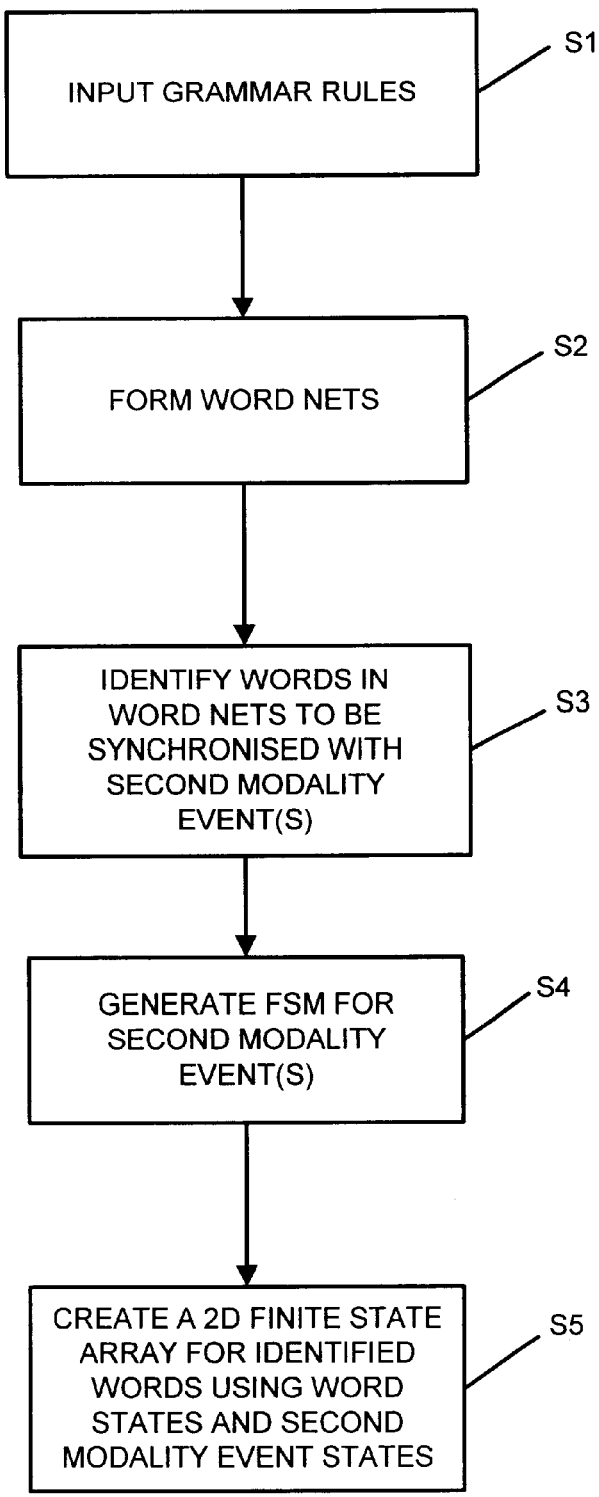
FIG. 3 is a flow diagram of the method of initialisation in the embodiment of the present invention.

The operation of the initialisation section of this embodiment of the present invention will now be described with reference to the flow diagram of FIG. 3.

In step S1 the grammar rules are input and in step S2 the word nets are formed for the grammar rules. Words in the word nets to be synchronised with the second modality event or events, are then identified in step S3 and in step S4 finite state machines for the second modality event or events are generated. For each of the words in the word nets a 2-dimensional finite state array for the identified words is then created at step S5 using the word states and the second modality event states. This is illustrated in more detail in FIG. 7. Considering the word "these" in the grammar rule, the second modality states (click states) comprise 0, 1, or 2+. The word states comprise six states corresponding to six extracted features of the speech for the word "these". The transition from each state has associated with it a probability. This probability is used in the recognition process as will be described in more detail hereinafter.

Figure 4:
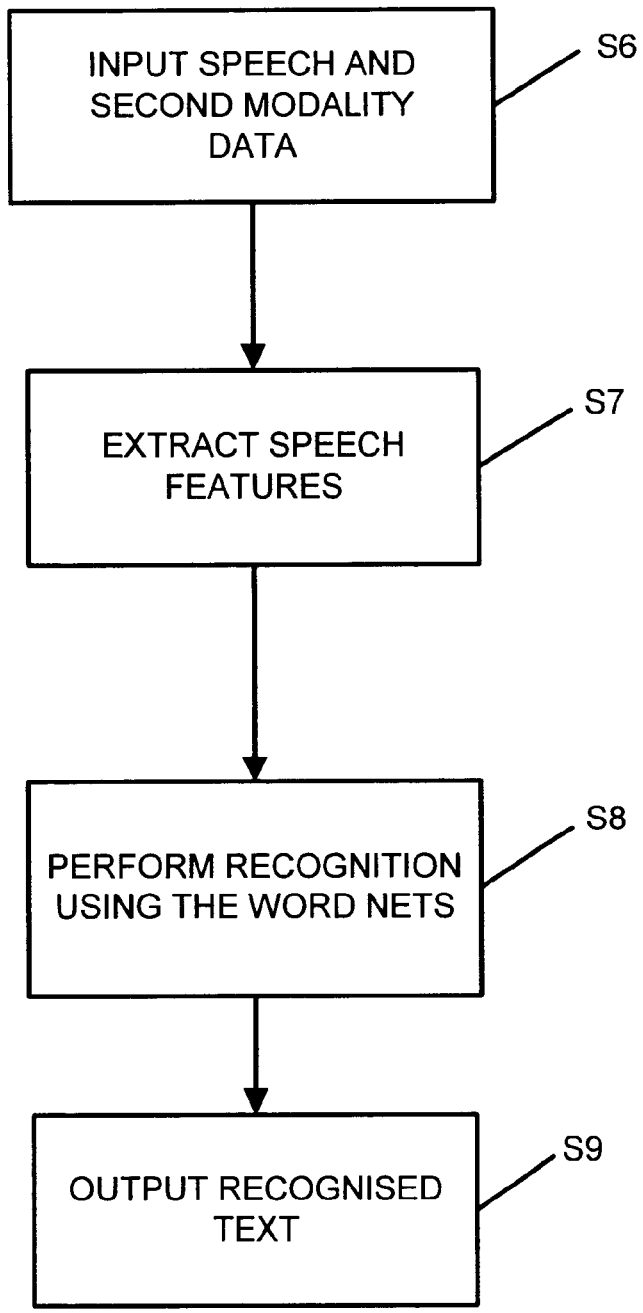
FIG. 4 is a flow diagram of the method of recognition in the embodiment of the present invention.
Figure 7:
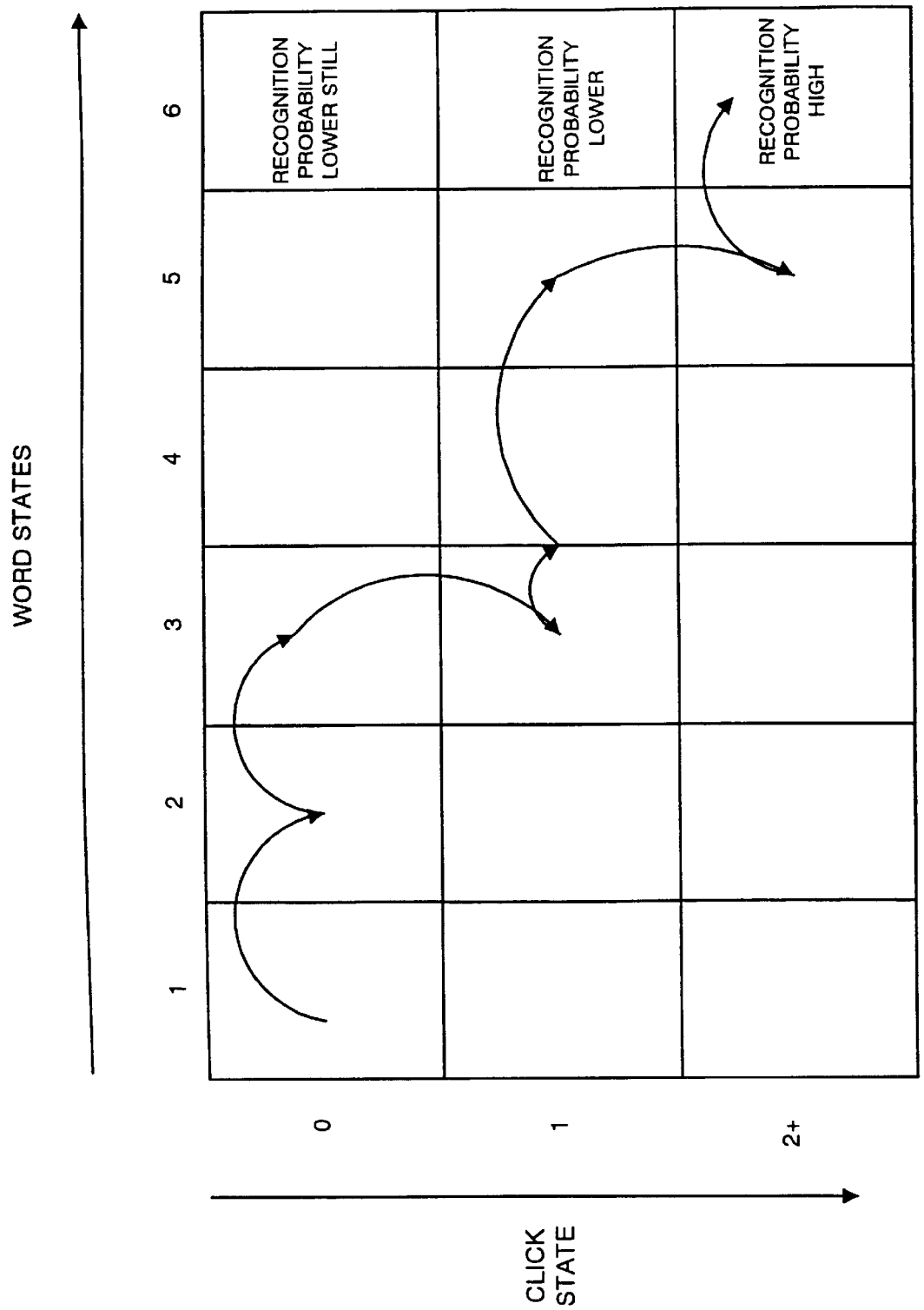
FIG. 7 is a diagram of an array of states in a word model using the recognition process of the embodiment of the present invention.

FIG. 4 is a flow diagram illustrating the recognition process. In step S6 the speech and second modality input are received and in step S7 the speech features are extracted. In step S8 recognition is performed using the word nets. As can be seen in FIG. 5, the grammar rule defines that the words "fax" or "send" should be followed by the words "this", "that" or "these". Thus, recognition uses these grammar rules. However, in order to recognise the words "this", "that" or "these", recognition is performed using the array of states as illustrated in FIG. 7. As features in the speech are input, they are matched to transitions across the array. Also as features i.e. clicks are received in the second modality input, these are matched to transitions down the array. Thus as illustrated in FIG. 7, speech features are received which are identified as transitions to word state 3. A click feature is then received and identified as a transition to click state 1. Two further speech features are then received identifying transitions to word state 5. A further click feature is received and identified as a transition to click state 2+ and finally a further speech feature is received and identified as a transition to word state 6. Thus a final state in the word model is reached.

In step S9 in FIG. 4, recognised text is output.

As mentioned hereinabove, the state transitions have associated with them probabilities. Thus an accumulated probability is obtained which will be high when the click state 2+ and the word state 6 is reached in the recognition process. A lower probability will be obtained for other states.

The recognition process illustrated in FIG. 7 for a single word will be carried out sequentially for sequential words in the word net and where words have second modality events associated therewith, the word models will have a second dimension defined by the second modality states in addition to the first dimension comprising the word states.

The word states used in the recognition process can comprise any conventional states used in speech recognition such as the states of a Hidden Markov model, or the states defined by dynamic time warping.

Although the present invention has been described hereinabove with reference to a specific embodiment, it will be apparent to a skilled person in the art that modifications can be made without departing from the spirit and scope of the present invention.

Although in the embodiment only a single second complementary modality is used, the present invention is applicable to any number of further complementary modalities whereupon the dimensionality of the array of states correspondingly increases.

The second modality input is not restricted to mouse events as given in the embodiment. The second modality input can comprise any other type of input such as gestures, or hand writing recognition. When more complex second modality inputs are used, more complex feature extraction is required in order to identify the events which are associated with words.

Features of second modality events can be input sequentially to the recognition process e.g. mouse clicks, or simultaneously e.g. features recognised from gestures such as one finger extended and the hand outstretched.

In the above described embodiments second modality inputs or events are associated with single words. The present invention may, however, also be applied where a second modality input or event is associated with a number of words, that is with a phrase.

It can be seen from the description of the embodiment of the present invention and the modifications that the present invention provides accurate recognition in a multimodal input system by using word models in the recognition process which are based not just on speech input but also on the or each further modality input.

What is claimed is:

1. A speech recognition method for use in a complementary multimodal input system, the method comprising the steps of:
   receiving a complementary multimodal input comprising digitized speech as a first modality input and data in at least one further modality input;
   identifying at least one feature in the speech and at least one feature in the data in said at least one further modality input; and
   recognising words by comparing identified features in the speech and in the data with states in models for words, said models having states for the recognition of speech, and for words having at least one feature in said at least one further modality associated therewith, said models also having states for the recognition of events in said at least one further modality, wherein said models each comprise an array of states having a dimensionality equal to the number of modes in the received multimodal input that are used in recognising said words.

2. A speech recognition method according to claim 1, wherein said models of words are organised in a net of words in accordance with grammar rules.

3. A speech recognition method according to claim 1, wherein said data in said at least one further modality input comprises data identifying events.

4. A speech recognition method according to claim 1, wherein the words are recognised by sequentially comparing identified features in the speech with the states in a first dimension and also comparing identified features in the further modality input or each further modality input in the further dimension or each respective further dimension to try to reach a final state.

5. A speech recognition method according to claim 1, wherein the states in the models for the recognition of speech comprise states of Hidden Markov models.

6. A speech recognition method according to claim 1, wherein said identified features define events in the further modality input or each further modality input.

7. A speech recognition method according to claim 6, wherein said events comprise pointing events comprising one or more actions.

8. A speech recognition method according to claim 1, wherein said states have probabilities associated therewith and the recognition step comprises comparing the identified features with the states to determine a word with the highest probability at a final state.

9. Program code for controlling a processor to implement the method of claim 1.

10. A carrier medium carrying the program code according to claim 9.

11. A multimodal input method comprising:
   using the speech recognition method according to any preceding claim to generate recognised words as a first modality input; and
   processing the recognised words and the further modality input or each further modality input in accordance with rules to generate an input for a process.

12. Speech recognition apparatus for use in a complementary multimodal input system, the apparatus comprising:
   receiving means for receiving a complementary multimodal input comprising digitized speech as a first modality input and data in at least one further modality input;
   identifying means for identifying at least one feature in the speech and at least one feature in the data in said at least one further modality input; and
   recognition means for recognising words by comparing identified features in the speech and in the data with states in models for words, said models having states for the recognition of speech, and for words having at least one feature in said at least one further modality associated therewith, said models also having states for the recognition of events in said at least one further modality, wherein said recognition means is adapted to use said models each comprising an array of states having a dimensionality equal to the number of modes in the received multimodal input that are used in recognising said words.

13. Speech recognition apparatus according to claim 12, including storage means for storing said models.

14. Speech recognition apparatus according to claim 12, wherein said recognition means is adapted to use said models organised in a net of words in accordance with grammar rules.

15. Speech recognition apparatus according to claim 12, wherein said receiving means is adapted to receive said data in said at least one further modality input comprising data identifying events.

16. Speech recognition apparatus according to claim 12, wherein said recognition means is adapted to recognise the words by sequentially comparing identified features in the speech with the states in a first dimension and also by comparing identified features in the further modality input or each further modality input in the further dimension or each respective further dimension to try to reach a final state.

17. Speech recognition apparatus according to claim 12, wherein said recognition means is adapted to use states of Hidden Markov models as the states in the models for the recognition of speech.

18. Speech recognition apparatus according to claim 12, wherein said identifying means is adapted to identify said features defining events in the further modality input or each further modality input.

19. Speech recognition apparatus according to claim 18, wherein said events comprise pointing events comprising one or more actions.

20. Speech recognition apparatus according to claim 12, wherein said recognition means is adapted to use said models wherein said states have probabilities associated therewith, and to compare the identified features with the states to determine a word with the highest probability at a final state.

21. A multimodal input system comprising:
speech input means for inputting speech as the first modality input;
speech digitizing means for digitizing the input speech;
further modality input means for inputting the data in the at least one further modality;
the speech recognition apparatus according to any one of claims 12 to 20 for generating recognised words using the digitised speech and the data in the at least one further modality; and
processing means for processing the recognized words and the further modality input or each further modality input in accordance with rules to generate an input for a process.

22. A processing system for implementing a process, the system comprising:
the multimodal input system according to claim 21 for generating an input; and processing means for processing the generated input.

23. A method of recognising speech using multimodal input data, the method comprising the steps of:
receiving multimodal data comprising speech data and data in at least further modality; and
recognising words by comparing features in the speech data and features in the further modality data with word models having states for the recognition of speech, wherein said word models each comprise an array of states each having a dimensionality equal to the number of modes in the received multimodal data.

24. A speech recognition method according to claim 23, wherein the step of recognising words comprises sequentially comparing features in the speech data with the states in a first dimension and comparing features in the data of the further modality or in each further modality with states in the further dimension or each respective further dimension to try to reach a final state.

25. A speech recognition apparatus, comprising:
a receiver operable to receive multimodal data comprising speech data and data in at least one further modality; and
a recogniser operable to recognise words by comparing features in the speech data and features in the further modality data with states in word models having states for the recognition of speech, each word model comprising an array of states having a dimensionality equal to the number of modes in the received multimodal input.

26. A speech recognition apparatus according to claim 25, wherein said recogniser means is adapted to recognise words by sequentially comparing features in the speech data with the states in a first dimension and by comparing features in the data in the further modality or each further modality with states in the further dimension or each respective further dimension to try to reach a final state.

27. A speech recognition apparatus for use in a complementary multimodal input system, the apparatus comprising:
a receiver operable to receive a complementary multimodal input comprising digitized speech as a first modality input and data in at least one further modality input;
an identifier operable to identify at least one feature in the speech and at least one feature in the data in said at least one further modality input; and
a recogniser operable to recognise words by comparing identified features in the speech and in the data with states in models for words, said models having states for the recognition of speech, and for words having at least one feature in said at least one further modality associated therewith, the models also having states for the recognition of events in said at least one further modality, wherein said models each comprise an array of states having a dimensionality equal to the number of modes in the received multimodal input that are used in recognising said words.

28. A method of recognising data using multimodal input data, the method comprising the steps of:
receiving multimodal data comprising data input using a plurality of modalities; and
recognising words by comparing features in the data input using the plurality of modalities with models representing words, the models having states for the recognition of data, wherein said models each comprise an array of states each having a dimensionality equal to the number of modes in the received multimodal data.

29. An apparatus for recognising data using multimodal input data, the apparatus comprising:
receiving means for receiving multimodal data comprising data input using a plurality of modalities; and
recognising means for recognising words by comparing features in the data input using the plurality of modalities with models representing words, the models having states for the recognition of data, wherein said models each comprise an array of states each having a dimensionality equal to the number of modes in the received multimodal data.

30. Program code for controlling a processor to implement the method of claim 28.

31. A carrier medium carrying the program code according to claim 30.

* * * * *